Oct. 27, 1959

J. D. EISLER ET AL 2,910,339

ELECTROGRAPHIC RECORDING APPARATUS

Filed June 19, 1957

INVENTORS:
JOSEPH D. EISLER
CHARLES F. HADLEY
BY
Newell Potter
ATTORNEY

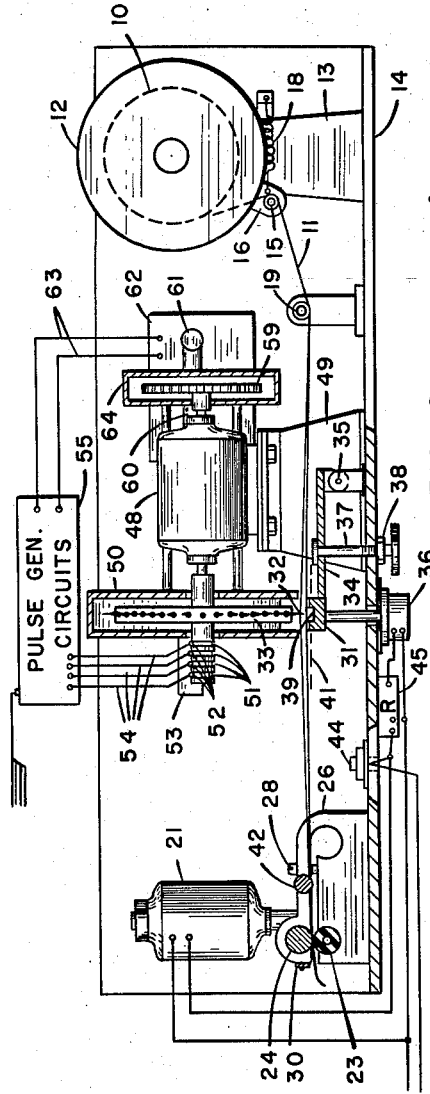

Oct. 27, 1959
J. D. EISLER ET AL
2,910,339
ELECTROGRAPHIC RECORDING APPARATUS
Filed June 19, 1957
3 Sheets-Sheet 3
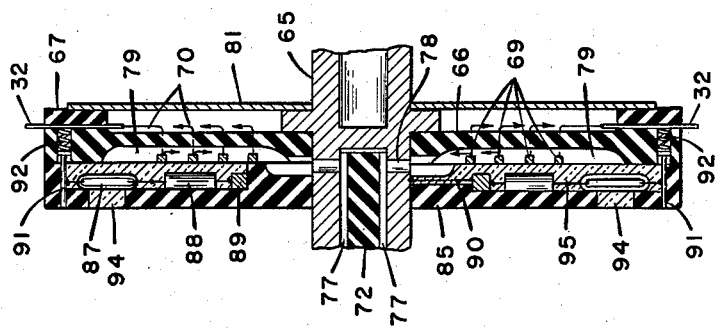
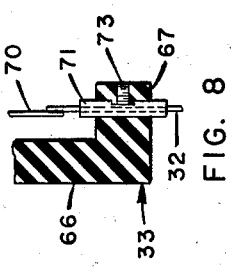
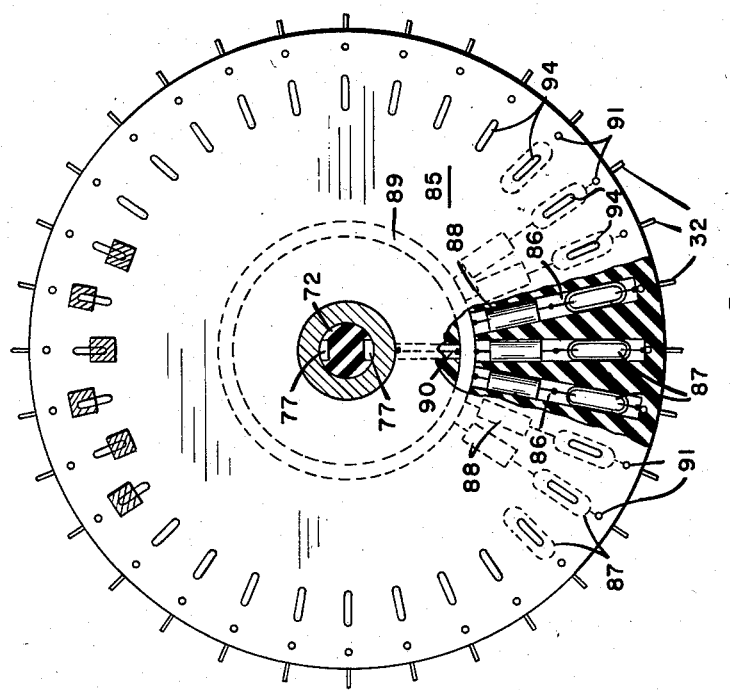
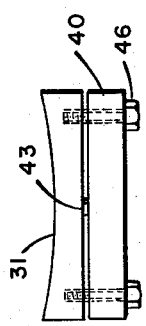
INVENTORS:
JOSEPH D. EISLER
CHARLES F. HADLEY
BY
Newell Pottory
ATTORNEY United States Patent Office 2,910,339
Patented Oct. 27, 1959

2,910,339
ELECTROGRAPHIC RECORDING APPARATUS

Joseph D. Eisler and Charles F. Hadley, Tulsa, Okla., assignors to Pan American Petroleum Corporation, Tulsa, Okla., a corporation of Delaware Application June 19, 1957, Serial No. 666,540

15 Claims. (Cl. 346—17)

This invention relates to recorders and is directed particularly to electrographic recorders which produce visible marks by means of electrical impulses upon a record medium which is preferably in strip form. More specifically, the invention is directed to the mechanism which transports, shapes, and marks upon the record strip, and it may also include in some embodiments means for rendering the marking pattern visible without using or wasting record material.

The invention has particular utility in making dry, non-photographic, visible recordings of multiple traces of data, such as the line deflection traces representing seismic waves received by a plurality of seismometers in geophysical surveying. While the invention was developed for and will be described with reference to this use, it will be obvious that it is equally applicable to the recording of other types of data as well as to printing alphabetical and numerical characters and the like.

The high-speed recorder which we have invented and developed produces multiple-trace recordings on electrosensitive paper of the type known commercially as Teledeltos. Electrical systems suitable for translating the signals into mark-producing impulses of electric current are fully described and claimed in our co-pending application S.N. 553,455, filed December 16, 1955. To describe this recording system briefly, however, a record strip is drawn lengthwise past the edge of a rotating disc carrying styli which sweep in succession transversely across the strip. It is appropriately curved and guided so that a light but definite contact is maintained between the strip surface and the stylus tips. At the proper times and places in each sweep of each stylus, brief impulses of electric current at high voltage pass through the strip and produce visible dots. Making the dots in sufficiently rapid succession tends to fuse them together into a continuous pattern or line.

In the operation of such recorders at high speeds, typified by a stylus velocity of 1500 inches per second across the record-receiving surface, certain problems arise that are not encountered at relatively slower speeds. It is necessary, for example, to control very accurately the contact pressure of the styli against the paper surface, both as to the amount of pressure and its time duration. A definite contact pressure must be maintained between each stylus and the paper surface throughout the stylus sweep, but if the paper is not in motion when this contact is established, tearing of the paper surface and bending of the styli may result. The strip must be accurately formed to the curve traced by the stylus tips, and as these tips wear away somewhat in use, adjustment is necessary to compensate for such wear. The record strip must also be moved lengthwise with a relatively constant speed and tension, at the same time avoiding wrinkles and folds due to the uneven stresses created in the strip by forming it into a curve. Surface material dislodged from the strip by the stylus friction and by the heating of the electric current impulses when marks are produced must be disposed of in some way to avoid fouling of the styli and impairment of the electrical insulation between different stylus circuits.

Solutions of these problems are desirable in substantially all uses of this type of recorder. For the multiple-trace recording of data in particular, however, it is additionally desirable to be able to monitor visually the individual traces as to their amplitude of deflection, freedom from extraneous noise, and the like. During normal recording, this can be done by observing the visible flashes of light created by the electric current impulses when they burn away the surface coating of the paper to create marks by exposing the underneath layer of contrasting color. There are times, however, when it is desirable to make these observations without running or wasting the recording paper.

It is accordingly the primary or basic object of our invention to provide a high-speed recording system which solves the foregoing enumerated problems. A more specific object is to provide a high-speed recording system having mechanism which moves the record-receiving strip with substantially constant speed and tension, without wrinkling, but with accurate and adjustable contact pressure against the recording styli, with compensation for stylus wear, and automatic delay of contact with the moving styli to avoid damage thereto and to the paper, as well as provision for removal of record surface dust. A further object is to provide in such a recorder a stylus wheel of balanced construction with suitable internal connections between the styli, as well as means for maintaining connections to outside pulse-generating circuits. A still further object is to provide, in such a recorder, means which are preferably detachable from the stylus wheel for rendering visible the trace-marking patterns without using or wasting recording paper. Other and further objects, uses, and advantages of the invention will become apparent as the description proceeds.

The manner in which the foregoing objects are accomplished can best be understood from a detailed description of the several figures of drawings showing various portions of the apparatus and modifications thereof. In these drawings, Figures 1 and 2 are respectively isometric and elevation views of an embodiment of the invention;

Figures 3 and 4 are respectively cross-section and elevation views of a preferred stylus disc;

Figures 5 and 6 are respectively elevation and cross-section views of a stylus disc and attachment for producing visible trace-marking patterns without using record paper;

Figure 7 is a detail view of a modified platen with curvature adjustment; and

Figure 8 is a detail view of an improved stylus holder.

Referring now to these drawings in detail, and particularly to Figures 1 and 2 thereof, a supply roll 10 of recording paper 11 in strip form is carried by a reel 12 mounted on a horizontal shaft supported by a pedestal 13 fastened to the base 14 of the recorder. The paper strip 11 unwinding from roll 10 passes across a horizontal tension-controlling roller 15 mounted on a movable arm 16 which pivots concentrically with the reel-supporting shaft, and which carries a felted friction pad or the like (not shown) which presses against the flange 17 of reel 12 with varying pressure. A tension spring 18 extending between the movable arm 16 and the pedestal 13 opposes the tendency of arm 16 to rotate clockwise due to the tension in the paper strip 11.

This is a conventional type of tension control in which the force of the spring 18 and the tension of the paper strip 11 are balanced against each other. For example, if the tension of paper strip 11 decreases, the spring 18 pulls arm 16 counterclockwise and increases the braking pressure of the friction pad against the flange 17 to increase the tension. If the paper tension increases, the opposite action takes place to decrease it. Thus, the arm 16 tends to seek an equilibrium position where the spring force and paper tension exactly balance each other, so that the paper 11 unrolls from the spool 10 with approximately constant tension regardless of the paper speed or the roll diameter. Furthermore, the movable arm 16 provides compliance which prevents tearing or jerking the paper when starting quickly or spilling the paper from roll 10 upon a quick stop. After the strip 11 leaves the roller 15, it passes underneath a stationary guide or roller 19 attached to the base 14.

Motive power for transporting the paper strip 11 is provided by a motor 21 of relatively constant speed, positioned at the opposite end of the base 14 from the supply roll 10, which motor through a one-way clutch mechanism 22 drives a rubber friction roller 23. The strip 11 is gripped between the friction roller 23 and a steel backing roller 24 mounted thereabove in contact with it, both rollers being mounted between a pair of supporting members 25 and 26 attached to the base 14. The supporting members 25 and 26 are slotted horizontally between the rollers 23 and 24 so that, by means of screws 27 and 28, the force between the rollers may be adjusted as desired. The one-way clutch 22 allows the strip 11 to be pulled forward without running motor 21, or if desired the strip may be advanced by hand by means of a knurled knob 29 attached to the end of the shaft of roller 23. A serrated blade 30 attached between the supports 25 and 26 close to where the strip 11 emerges from between rollers 23 and 24 provides a convenient edge against which to tear off segments of the strip 11.

Between the guiding roller 19 and the pulling rollers 23 and 24, the strip 11 passes over a curved platen 31 which shapes the strip into a cylindrical arc of the proper shape to be contacted by mark-producing styli 32 carried on the edge of a disc 33. The platen 31 is at one end of a horizontal plate 34, the other end of which is attached by a pivot 35 to supports mounted on the base 14. Underneath the platen 31, attached to or underneath the base 14, is a solenoid 36 having a projecting core member adapted, upon the application of proper electrical-control current to the solenoid 36, to raise and lower the platen 31 and the paper 11 to and from a position of contact with the styli 32. An adjusting screw 37 threaded through the base 14 and held fixed by a lock nut 38 passes through the plate 34, so that an enlarged head of the upper end of the screw 37 forms a stop limiting the upward movement of the platen 31 by the solenoid 36.

A groove 39 extends across the curved upper face of platen 31 directly underneath the line of contact between the styli 32 and the strip 11. This groove provides some compliance for the strip 11 at this line of contact, so that the pressure of the styli against the strip face is much more easily adjusted by means of the screw 37 than would be true if the curved platen face were solid. Also, because of the paper compliance provided by this groove, minor variations in paper thickness and surface smoothness cause no difficulties, and some degree of wearing of the styli is accommodated by periodic readjustment of the screw 37, at the expense of tolerating a somewhat greater stylus pressure at the center of strip 11 than at its edges.

In Figure 7 is an additional adjustment means which we have found very useful in regulating stylus pressure and compensating for wear. Aligned with the platen 31 is a steel bar 40. The center of bar 40 is spaced from the center of platen 31 by a thin metal strip or shim 43, while the ends of the bar are drawn toward the ends of the platen by studs or screws 46. By thus applying force at three spaced points to flex or bend the bar 40, a slight reverse bending of the platen results to alter its curvature. In practice, the bar 40 acts on the plate 34 close to the platen 31 and may be placed against either surface of the plate depending on whether it is desired to increase or decrease the platen curvature. It will be understood that the amount of bending needed is ordinarily small and may be varied in several ways, such as by changing the thickness of shim 43, or the tension of screws 46, or both.

In order to assure the accurate forming of the strip 11 into a cylindrical surface by the platen 31 and also to provide a definite pressure against the platen for the electrically-conducting backing of the strip, the rollers 23 and 24 and the guide 19 are preferably so aligned that, with the platen 31 in raised position, the strip 11 is lifted slightly above the level of a dotted line 41. This line is the position which strip 11 would occupy if it were stretched tightly between guide 19 and the rollers 23, 24 in the absence of platen 31.

Distortion of the strip in this manner tends to cause longitudinal creases or wrinkles to form in the strip as it passes between the rollers 23 and 24, but we have found that these creases are quite effectively prevented by a rounded or tapered roller 42. This roller is positioned so as to press against the upper face of strip 11 shortly before it enters the rolls 23, 24. The contour of the roller 42 has approximately the curvature which the strip 11 would assume at the position of the roller if the strip 11 changed uniformly from a cylindrical arc at platen 31 to a flat surface at the rolls 23, 24.

Mounted on base 14 at any conveniently accessible place is a manual switch or push-button 44. Electrically connected between the switch 44 and the solenoid 36 is a delay relay 45. Switch 44 extends also between the motor 21 and a source of electrical power so that it thereby controls the application of power from the source to the motor 21 and through the relay 45 to the solenoid 36. The function of relay 45 is to slow down or delay the raising of platen 31 by the solenoid 36 until after the motor 21 has started strip 11 in motion at a substantial speed. In this way sawing or tearing of the strip 11 by the rapidly moving styli 32 along a stationary line of contact is automatically prevented.

Rotation of the disc 33 at a constant speed is accomplished by mounting it on the shaft of a synchronous motor 48 which is fastened to a base 49 offset so as to permit the strip 11 to pass underneath. Surrounding the disc 33 is a housing 50 supported from the shell of motor 48, which housing is almost completely closed except for an opening at the bottom through which the styli 32 project to make contact with the strip 11. An extension from the hub of disc 33 carries a plurality of insulated slip rings 51 respectively contacted by a similar plurality of stationary brushes 52 which project from an insulating brush holder 53 mounted on the housing 50 or some similar fixed support. From the holder 53 separate electrical leads 54 extend to circuits 55 which generate electrical marking impulses.

These circuits 55 have been indicated only diagrammatically in block form as their particular characteristics are not of importance in the present invention, and they have been described in detail in our co-pending application mentioned above. It is believed sufficient to state here only that circuits 55 provide impulses of electric current of proper magnitudes and timing to produce the desired marking of the strip 11 as it passes underneath the styli 32 sweeping across it.

When marks are created on Teledeltos paper, the opaque surface layer is burned away by the electric current due to the resistance heating of this layer. This exposes an underneath layer of contrasting color which is thus viewed as the produced mark. This burning away of the surface layer creates a substantial quantity of dust or smoke which must be disposed of because of its electrically conductive properties, to prevent its depositing on the surfaces of electrical insulation members of the stylus disc assembly. To dispose of this dust, a duct 57 extends from the interior of the housing 50 to a suction device 58 such as a vacuum cleaner provided with a dust-collecting bag. The current of air thus created enters the opening in housing 50 adjacent the surface of the strip 11 as it is being marked and quite effectively entrains the paper surface dust as it is formed, removing it before it deposits to any appreciable extent on the parts relied on for electrical insulation. Preferably, the motor of the suction device 58 is wired in parallel with the motor 21 so as to be started and stopped by the same push-button 44.

In most uses of this recorder it is necessary to supply electrical impulses which are synchronized or related to the position of the styli on the strip 11 with respect to the edges of the strip. Electrical synchronizing impulses for this purpose may be generated in a variety of ways, one of the more desirable being that illustrated using a toothed disc 59 mounted on the same shaft as the disc 33, preferably at the opposite end of the motor 48. The apertures or teeth of the disc 59 interrupt the light beam passing from a light source 60 to a photocell 61, the electrical output of which is suitably amplified by an amplifier 62 and otherwise shaped into pulses of the desired amplitude and form for transmission over the leads 63 to the circuits 55, where triggering of the operation of those circuits may be accomplished. Both for reasons of safety and shielding against stray light, the disc 59 is preferably enclosed by a hood or housing 64.

In Figures 3 and 4 are shown a number of the details of construction of a preferred form of stylus disc 33. This disc comprises a central hub 65 which fits the shaft of the motor 48 and is held thereon by set screws or the like, not shown. The main body 66 of the disc 33 is preferably formed of a strong insulation material such as fabric-reinforced Bakelite and is attached by screws or the like to a flange on the hub 65. The individual styli 32 are clamped in radial grooves on one side of the disc near its edge by means of a Bakelite ring 67 of about the same diameter as the disc which is held securely by a large number of clamping screws 68.

On the opposite face of the disc body 66 are a plurality of distribution rings 69 set in concentric grooves equal in number to the number of the styli which are allowed to contact the strip 11 at any given instant. In the example illustrated here four styli are shown for illustrative purposes, while in one disc as actually constructed there were fourteen. The total number of styli 32 around the edge of the disc 33 may be regarded as composed of a plurality of stylus sets, each containing four styli. Each one of the four styli occupying a given position within each set is connected to one of the four distribution rings by the leads 70 indicated as dashed lines in Figure 4. Thus, each distribution ring 69 serves as the means for interconnecting one stylus in each set of four to the corresponding stylus in every other set.

The slip-ring assembly comprises a cylindrical rod 72 formed of electrically insulating material and held by set screws or the like in a recess at the opposite end of the hub 65 from that which attaches to the motor shaft. On the projecting portion of the rod 72 are alternately stacked the metallic conducting slip rings 51 and insulating spacer rings 74, all of which are held in place by an end cap 75. An insulated conductor 76 extends from each slip ring 51 to a corresponding one of the distribution rings 69 through a groove 77 milled lengthwise in the rod 72, thence through a hole 78 in the hub 65 and along a radial slot or groove 79 in the face of disc body 66, passing underneath the distribution rings 69 to connect to one of them. By providing the grooves 77, holes 78, and slots 79 in offsetting pairs as shown, the dynamic balancing of disc 33 is facilitated so that it runs at high speed with minimum vibration. Cover plates 80 and 81 on the two sides of the disc 33 help to prevent deposits of record surface dust from accumulating thereon and reducing the effectiveness of the insulation between the electrically separated stylus circuits.

We have found in operation that the life of the styli 32 is much improved by a modification of the stylus mounting such as is illustrated in Figure 8. Each stylus wire 32 passes through a small metal tube 71 permanently set in the edge of disc 33 and is clamped therein by a set screw 73. Electrical connection is made to the lead 70 by soldering it to the wire 32, or the lead 70 can be soldered to the tube 71. This both facilitates replacing worn styli and minimizes stylus breakage, which appears to be due to fatigue caused by flexing or vibration of the styli as they make and break contact with the record strip and sweep across it. The increased stylus life due to the added support and rigidity provided by the portion of tube 71 projecting beyond the edge of disc 33 more than offsets the greater complexity of this detail of disc construction.

In operating with high stylus speeds, it is necessary that the current impulses to produce satisfactory marks be of very short duration and high intensity. A typical stylus speed of 1500 inches per second thus requires current impulses of about one-quarter ampere and 15 microseconds' duration obtained by voltages of the order of 700 volts. Compared with operating at lower speeds, the burning away of the surface coating of the Teledeltos paper occurs with almost explosive rapidity, and the material burned away becomes incandescent. The positions of the traces are thus represented by flashes of light in such close succession as to appear continuous because of the high dot-repetition rate of about 2500 per second and because of the persistence of vision. These trace dots appear to move from side to side and thus present a visual display of the trace deflections. Although the movement may be too rapid to follow in detail visually, it is informative in that it shows the amplitudes of the deflections of the different traces, as well as the presence of noise when no signals are being applied.

With the apparatus thus far described visual monitoring of the traces in this manner requires moving strip 11 past the styli 32, thus wasting record material if recording is not desired. In the modification of the invention shown in Figures 5 and 6 such visual indication of the trace deflections is provided without the use and wasting of recording paper. In this embodiment a disc 85 is placed against one side of the disc 33, preferably that side which contains the slip ring assembly and the distribution rings, the disc 85 also being of Bakelite or other appropriate insulating material and having a number of radially extending grooves 86 equal in number and angular spacing to the styli 32 on the disc 33. In each groove 86 is placed a small neon glow tube 87 wired in series with a current limiting resistor 88 connected in turn to a ground ring 89 from which a lead 90 extends to the hub 65. At the outer end of the groove 86 connection from the other terminal of the glow tube 87 is made to a pin 91 which projects from the side of plate or disc 85 so as to make electrical contact to each stylus 32 in some suitable manner, for example through the medium of a small compression spring 92 placed in a hole extending through the disc body 66 to each stylus 32. From the base of each groove 86 underneath the position of the neon tube 87, a narrow aperture 94 extends through the disc 85 to its opposite face, being the face exposed to view when the disc is placed in contact with the disc 33. In constructing the disc 85, after all of the components are in place in the grooves 86, they are preferably filled with a transparent plastic or synthetic-resin potting material 95 to fix the components solidly in place.

In use, signal impulses applied to the styli 32 cause instantaneous lighting of each glow tube 37 when the stylus is at a position to produce a trace-recording dot regardless of whether there is record material 11 in contact with the stylus 32 or not. These flashes are visible through the slots 94, and the angular positions of the various slots at the instants of occurrence of light correspond to the angular stylus positions of marking. Thus, actual marking of a record is not necessary, but, if there is recording material in place, the small current drawn by the glow tubes 87 does not appreciably affect the producing of marks on the record due to the high resistances 88. As will be apparent, the disc 85 is in the form of an attachment to the disc 33 which may replace the cover plate 80, but if preferred for any reason the two discs could be fabricated as a single unit.

In practice, a certain degree of overlapping of adjacent traces is allowed to occur in the same manner as in the photographic recording of deflected-trace records. In making visible the marking patterns of the styli for such traces, they may appear to overlap so as to make it difficult to visualize any particular trace by itself. A modification which is shown in the upper portion of Figure 5 will avoid this difficulty, by presenting the visual displays of adjacent styli in different offset rows. By covering most of the windows 94 and leaving their transparent portions offset at different radial distances from the center of the disc 85, the individual trace displays can be seen as separate images without overlapping. All of the styli which record a given trace have their transparent windows 94 at the same radial distance from the disc center, while the styli that record adjacent traces which may overlap the given trace have such windows at a different distance.

It will be understood that this manner of separation of the visual presentation of adjacent traces is only one example of many configurations of apertures and the like which can be readily devised to accomplish this purpose. Besides, such display may be made to occur at any location adjacent the edge of the disc 33 and not necessarily only at the marking position at the bottom of the disc adjacent the strip 11.

While we have thus described our invention in terms of the foregoing specific embodiments and details thereof, it is to be understood that still further modifications and details will be apparent to those skilled in the art. The scope of the invention therefore should not be considered as limited to the details set forth, but it is properly to be ascertained by reference to the appended claims.

We claim:

1. Recording apparatus comprising, in combination, means for holding a supply roll of electrosensitive record-receiving material in strip form, brake means acting on said holding means and responsive to the tension in said strip for releasing said strip with approximately constant tension, stationary guide means adjacent said holding means and past which said strip moves, a pair of cylindrical rollers spaced from said guide means and adapted to press against opposite sides of said strip, at least one of said rollers being resilient, power means for driving at least one of said rollers at substantially constant speed and thereby moving said strip lengthwise, a movable platen and means for moving said platen about midway between said guide means and said pair of rollers, a disc carrying a plurality of spaced styli projecting from its edge adjacent said platen, means for rotating said disc at substantially constant speed about an axis offset from and approximately parallel to the length of said strip, said platen having a concave surface adapted to contact the back of said strip and curve it into a concave cylindrical shape so that said styli can maintain contact with the face of said strip as they sweep across it in succession during rotation of said disc, adjustable stop means for limiting the movement of said platen toward the edge of said disc, means for delaying the operation of said platen-moving means until said roller-driving power means has started said strip in motion lengthwise, and electrical circuit means synchronized with the rotation of said disc for transmitting mark-producing impulses of electric current to said styli.

2. Apparatus as in claim 1 including also a tapered roller pressing against the face of said strip between said pair of rollers and said platen, the contour of said tapered roller having substantially the curvature of said strip at the position of said roller in changing uniformly from a cylindrical arc at said platen to a flat surface at the position of said pair of rollers.

3. Apparatus as in claim 1 wherein the concave surface of said platen has a groove extending along the line of contact between the tips of said styli and the surface of said strip, whereby the contact pressure of said stylus tips tends to force said strip into said groove.

4. Apparatus as in claim 3 including also a bar aligned with and close to said platen, and means for applying forces between said platen and said bar at three spaced points, said forces tending to bend said bar and thereby flexing said platen to change its curvature.

5. Apparatus as in claim 1 including for each of said styli a tubular member fixed in said disc and extending radially past the edge thereof, said each of said styli extending through a corresponding tubular member, and means for clamping each of said styli in position in said corresponding member.

6. Apparatus as in claim 1 wherein said stylus disc has $n$ concentric electrically conducting rings, an electrical lead extending from every $n$th stylus, counting in succession around the disc periphery, to the same one of said rings, whereby each of said styli is connected to one and only one of said rings, $n$ being the number of styli which can be simultaneously in contact with the surface of said strip, and an electrical lead extending from each of said rings to a slip ring close to the axis of rotation of said disc adapted to be contacted by a stationary brush.

7. Apparatus as in claim 1 wherein said guide means and said pair of rollers are so aligned with respect to said platen, that when said platen moves said strip to a position limited by said stop means, with said strip in contacting position to said styli, said strip is closer to said styli than a straight line extending between said rollers and said guide means.

8. Apparatus as in claim 1 including a high resistance and a transparent, gas-containing electrical discharge tube connected in series between each of said styli and a conductor at electrical ground potential.

9. Apparatus as in claim 8 wherein said resistance and said discharge tube are mounted on and rotatable with said stylus disc.

10. Apparatus as in claim 1 including a hood substantially surrounding said disc and styli except for an opening through which said styli contact said strip, a duct opening into said hood, and air suction means for drawing air into said opening and through said duct to entrain particles dislodged from the face of said strip.

11. A stylus-carrying disc dynamically balanced for rotation at high speed for electrographic marking on an electrosensitive record medium by electric current passing from styli to said medium comprising a disc formed of solid electrically-insulating material, a plurality $mn$ of styli solidly mounted on and evenly spaced around the edge of said disc and projecting therefrom, said styli being subdivisible into $m$ sets of $n$ styli each where $m$ and $n$ are integers greater than one, a plurality $n$ of concentric conducting rings set in radially spaced grooves on one face of said disc and concentric with said disc, an electrical lead connecting each of said styli to one and only one of said rings, the styli proceeding in order in a given direction around said disc being connected to said rings proceeding in order radially with respect to the disc center, whereby each ring serves to interconnect $m$ of said styli spaced uniformly around said disc, a rod member projecting axially from the center of said disc, a plurality $n$ of slip rings of substantially smaller diameter than said disc insulated from each other and supported by said rod member, and $n$ insulated electrical leads each extending through one of a plurality of passages evenly spaced around said rod and said disc and each connecting one of said $n$ concentric rings to a corresponding one of said $n$ slip rings.

12. A platen assembly for shaping an electrosensitive record medium in strip form into a cylindrical arc adapted to be contacted by styli mounted on the edge of a disc, said assembly comprising a base member, a plate pivotally attached at one end to said member and approximately parallel thereto, a platen attached to the other end of said plate, said platen having a concave surface of the same curvature as said arc, there being a groove extending along said concave surface at a line of contact between said styli and a record strip being shaped and supported by said platen, whereby the contact pressure of said styli against the surface of said strip tends to force it into said groove, electromechanical means for moving said platen to and from a stylus-contacting position by the pivoting of said plate, adjustable limit means for limiting the movement of said platen toward said contacting position, and means for delaying the operation of said electromechanical means for an interval of time following the closing of an electrical energizing circuit.

13. An assembly as in claim 12 including also a bar extending generally parallel to said platen, and means for applying forces between said platen and three spaced points of said bar tending to bend said bar and thereby flexing said platen.

14. Trace visualizing means for an electrographic recorder which marks an electrosensitive record medium by electric current impulses passing from styli on a rotating stylus disc to said medium, said visualizing means comprising a plurality of transparent gas-discharge glow tubes at least equal in number to the number of said styli which can simultaneously contact said medium, a plurality of insulated electrical leads, each extending between one of said styli and one terminal of one of said glow tubes, a plurality of current-limiting resistors each connected between the other terminal of one of said glow tubes and a conductor at electrical ground potential, means supporting said glow tubes, leads, resistors, and conductor in fixed relation to each other, and a disc rotatable in synchronism with said stylus disc and containing a plurality of apertures at the same angular spacing as said styli and through which said glow tubes may be viewed, whereby voltage impulses applied to said styli to produce record marking cause said glow tubes to emit light impulses visible through said apertures at positions corresponding to the instantaneous positions of the marking styli.

15. Trace visualizing means as in claim 14 wherein said glow tubes, leads, resistors, and conductor are mounted on and rotatable with said aperture disc.

References Cited in the file of this patent

UNITED STATES PATENTS

| | | |
|---|---|---|
| 2,127,331 | Fulton | Aug. 16, 1938 |
| 2,551,466 | Legagneur et al. | May 1, 1951 |
| 2,576,395 | Gauld | Nov. 27, 1951 |
| 2,637,024 | Lyman et al. | Apr. 28, 1953 |
| 2,648,589 | Hickman | Aug. 11, 1953 |